United States Patent
Okada (10) Patent No.: US 8,106,767 B2
(45) Date of Patent: Jan. 31, 2012

(54) WIRELESS TAG COMMUNICATION SYSTEM AND IMAGE FORMING APPARATUS

(75) Inventor: Masanori Okada, Osaka (JP)

(73) Assignee: Kyocera Mita Corporation (JP)

( * ) Notice: Subject to any disclaimer, the term of this patent is extended or adjusted under 35 U.S.C. 154(b) by 295 days.

(21) Appl. No.: 12/611,987

(22) Filed: Nov. 4, 2009

(65) Prior Publication Data

US 2010/0117801 A1 May 13, 2010

(30) Foreign Application Priority Data

Nov. 10, 2008 (JP) .................................. 2008-287342

(51) Int. Cl.
*G08B 1/08* (2006.01)

(52) U.S. Cl. ................... 340/539.21; 340/10.4; 340/5.8; 399/30; 399/12; 399/58; 342/124; 342/42

(58) Field of Classification Search ............. 340/539.21, 340/10.4, 5.8, 618, 10.1; 399/30, 12, 58; 342/124, 42

See application file for complete search history.

(56) References Cited

U.S. PATENT DOCUMENTS

| 4,837,840 | A  | * | 6/1989  | Goldman ................... 382/135 |
|-----------|----|---|---------|------------------------------------|
| 6,184,818 | B1 | * | 2/2001  | Meinel .................... 342/124 |
| 7,113,125 | B2 | * | 9/2006  | Le Sesne .................. 342/124 |
| 7,532,829 | B2 | * | 5/2009  | Okada ......................... 399/27 |
| 7,995,935 | B2 | * | 8/2011  | Okada ......................... 399/30 |
| 8,026,940 | B2 | * | 9/2011  | Kitao et al. ................ 347/261 |
| 2009/0112101 | A1 | * | 4/2009 | Furness et al. .............. 600/477 |
| 2009/0206987 | A1 | * | 8/2009 | Aubin et al. ................ 340/5.8 |
| 2009/0224930 | A1 | * | 9/2009 | Burza ....................... 340/618 |
| 2010/0278544 | A1 | * | 11/2010 | Pfeuffer ...................... 399/12 |

FOREIGN PATENT DOCUMENTS

JP 10-228523 8/1998

* cited by examiner

*Primary Examiner* — Benjamin C Lee
*Assistant Examiner* — Peter Mehravari
(74) *Attorney, Agent, or Firm* — Gerald E. Hespos; Michael J. Porco (57) ABSTRACT

An antenna outputs query signals to a wireless tag, and receives response signals output from the wireless tag. An intensity detection circuit detects the signal intensity of the response signals. A control portion judges the type of toner housed in a cartridge, or whether the toner is a certified product or a non-certified product, from the detected signal intensity. Further, the control portion outputs to an output setting circuit an instruction signal to change the signal intensity of the query signals, such that normal wireless communication can be performed with the wireless tag.

8 Claims, 10 Drawing Sheets

WIRELESS TAG COMMUNICATION SYSTEM AND IMAGE FORMING APPARATUS

BACKGROUND OF THE INVENTION

1. Field of the Invention

This invention relates to a wireless tag communication system to perform wireless communication with a wireless tag mounted on a toner cartridge, and to an image forming apparatus in which the toner cartridge can be removably installed.

2. Description of the Related Art

Printers, fax machines, copiers, and other image forming apparatus comprising a developer portion, which uses a two-component developer comprising a toner and a carrier to develop an electrostatic latent image on a photosensitive drum surface, employ toner supplied from a cartridge installed in the device main body to develop a toner image of the electrostatic latent image, and perform image formation by transferring the toner image onto paper or similar. And, when the toner within the cartridge is depleted, the toner within the image forming apparatus is replenished when the user replaces the cartridge with a new cartridge.

In this case, if the newly replaced cartridge is a genuine product of the manufacturer of the image forming apparatus, or is a product certified by the manufacturer (hereafter together called a "certified product"), then no problems arise; but of late there have been cases in which cartridges other than certified products (non-certified products) are used. When a cartridge which is not a certified product is used, not only is the performance of the image forming apparatus not adequately exploited, but malfunction of the image forming apparatus can occur as a result.

Hence in many image forming apparatus developed in recent years, cartridges are managed using RFID (Radio Frequency Identification: wireless automated identification) technology or similar. Specifically, a wireless tag, in which is stored cartridge and toner information as tag information, is mounted on the cartridge, and after the cartridge is installed, a communication unit arranged in the main body of the image forming apparatus reads the tag information, so that by this means, whether the installed cartridge is a certified product can be ascertained.

However, if tag information which is the same as the tag information stored in the wireless tag of a certified product cartridge is stored in the wireless tag of a non-certified product cartridge, the apparatus can be made to recognize the installation as that of a certified cartridge. Hence using only the information stored in the wireless tag of a cartridge, it is difficult to judge whether the toner actually housed in the cartridge is a certified product.

SUMMARY OF THE INVENTION

This invention was devised to resolve the above problem, and has as an object the provision of a wireless tag communication system and an image forming apparatus which are capable of accurately judging the type of toner housed in a cartridge.

That is, this invention relates to a wireless tag communication system, comprising: a communication portion which outputs a query signal to a wireless tag mounted on a toner housing body, and which receives a response signal in response to the query signal from the wireless tag, to perform wireless communication; a detection portion which detects the signal intensity of the response signal; and a judgment portion which, when the query signal is output from the communication portion at a normal signal intensity determined in advance, judges the type of toner housed in the toner housing body from the signal intensity of the response signal output from the wireless tag.

DETAILED DESCRIPTION OF THE PREFERRED EMBODIMENTS

Below, the wireless communication system and image forming apparatus of embodiments of the invention are explained, referring to the drawings. Printers are explained as examples of image forming apparatus in these embodiments, but the image forming apparatus may also be a copier, fax machine, or another image forming apparatus which performs printing using a toner comprising magnetic material.

First Embodiment

Figure 1:
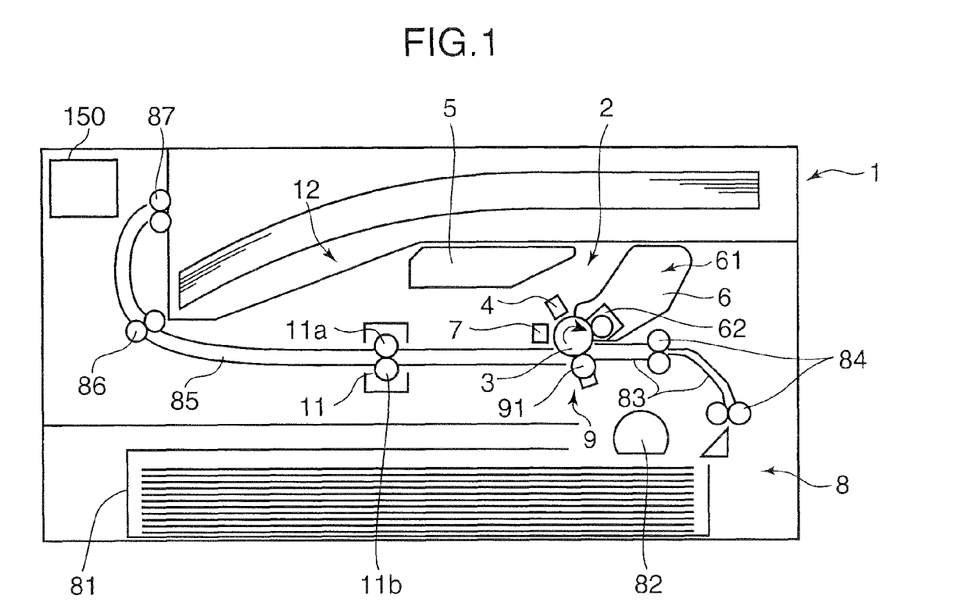
FIG. 1 is a summary cross-sectional view of a printer.

FIG. 1 is a cross-sectional view showing in summary the internal configuration of the printer 1 of the present embodiment. The printer 1 comprises a paper feed portion 8, image formation portion 2, transfer portion 9, fixer portion 11, paper eject tray 12, display panel 150, and similar.

The image formation portion 2 comprises a photosensitive drum 3, charging portion 4, exposure portion 5, developer portion 6, cleaning portion 7, and similar. The photosensitive drum 3 is an image carrier which forms a toner image. The charger portion 4 causes the surface of the photosensitive drum 3 to be uniformly charged. The exposure portion 5 exposes the peripheral surface of the uniformly charged photosensitive drum 3, causing an electrostatic latent image to be formed. The developer portion 6 visualizes the electrostatic latent image thus formed to create a toner image. The toner image created in this way is transferred onto recording paper by the transfer portion 9. The cleaning portion 7 removes the residual toner on the surface of the photosensitive drum 3 after completion of transfer.

The transfer portion 9 comprises a transfer roller 91, and in the state in which the transfer roller 91 is pressed against the photosensitive drum 3, transfers the toner image formed on the photosensitive drum 3 onto recording paper transported from the transport path 83. The paper feed portion 8 comprises a feed paper cassette 81, pickup roller 82, transport path 83, transport roller 84, and similar; recording paper stacked in the feed paper cassette 81 is fed to the lower side (downstream side) of the image formation portion 2 and transfer portion 9.

The fixer portion 11 is provided on the downstream side of the image formation portion 2 and transfer portion 9, and has a heat roller 11a and a pressure roller 11b. The fixer portion 11 performs fixing processing of the toner image transferred to the recording paper. On the side still further downstream from the fixer portion 11 are provided a transport roller 86, eject roller 87, transport path 85 and similar; recording paper for which fixing processing has been performed by the fixer portion 11 is transported further downstream on the transport path 85 by these rollers, and is ejected into the paper eject tray 12 in the upper portion of the printer 1. The display panel (display portion) 150 displays various messages and images according to control by the display control portion 180, described below.

Figure 2:
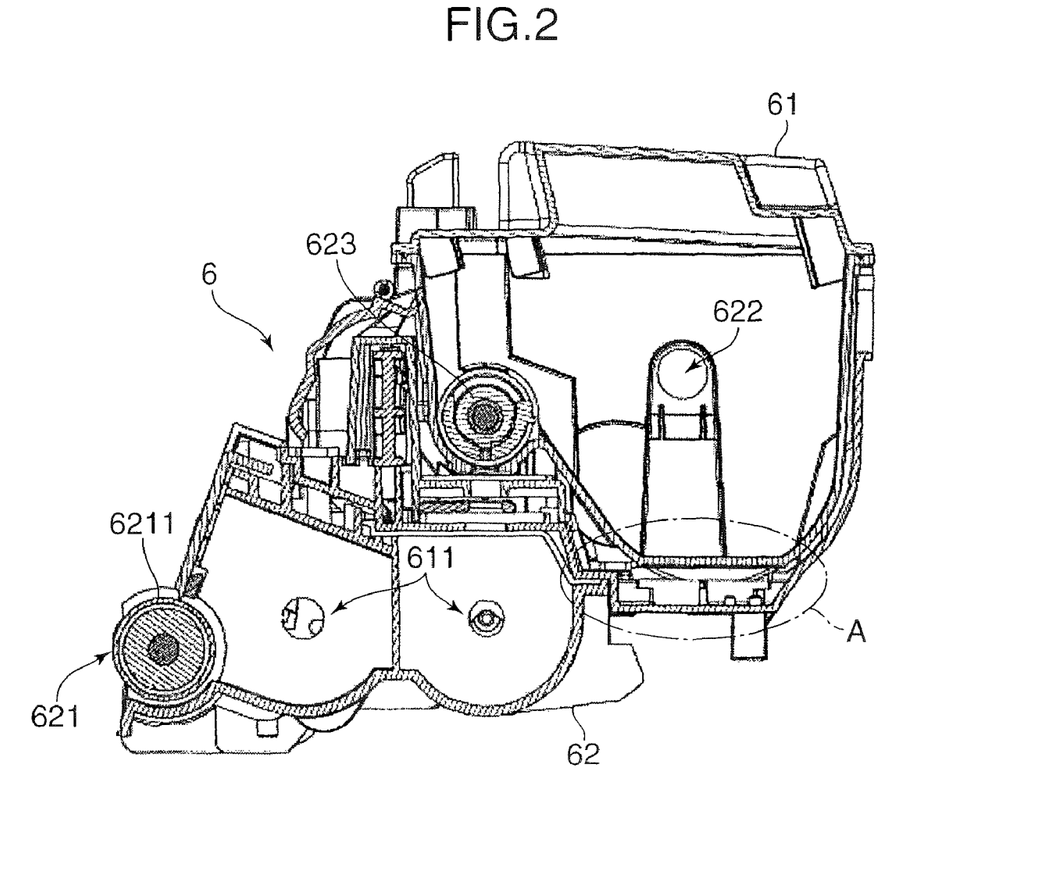
FIG. 2 is a cross-sectional view showing the detailed configuration of a developer portion.

FIG. 2 is a cross-sectional view showing the detailed configuration of the developer portion 6. The developer portion 6 comprises a cartridge which houses toner (developer) (toner housing body) 61, and a developer unit 62 comprising a developer roller 621 and similar; through the rotational driving of a takeup roller 622 and supply roller 623, the toner of the cartridge 61 is supplied to a mixing portion, and through rotational driving of a mixing roller 611 (mixing screw), toner is supplied to the developer roller 621. A developer sleeve 6211 is provided on the outer periphery of the developer roller 621, a development bias is applied to this developer sleeve 6211, and the toner, which has been positively charged by the mixing portion, is adsorbed onto the exposure portion (the portion of the electrostatic latent image formed by removing electrostatic charge through exposure) on the surface of the photosensitive drum 3. The developer portion 6 is configured such that the cartridge 61 can be installed in the developer unit 62 so as to enable removal.

Figure 3:
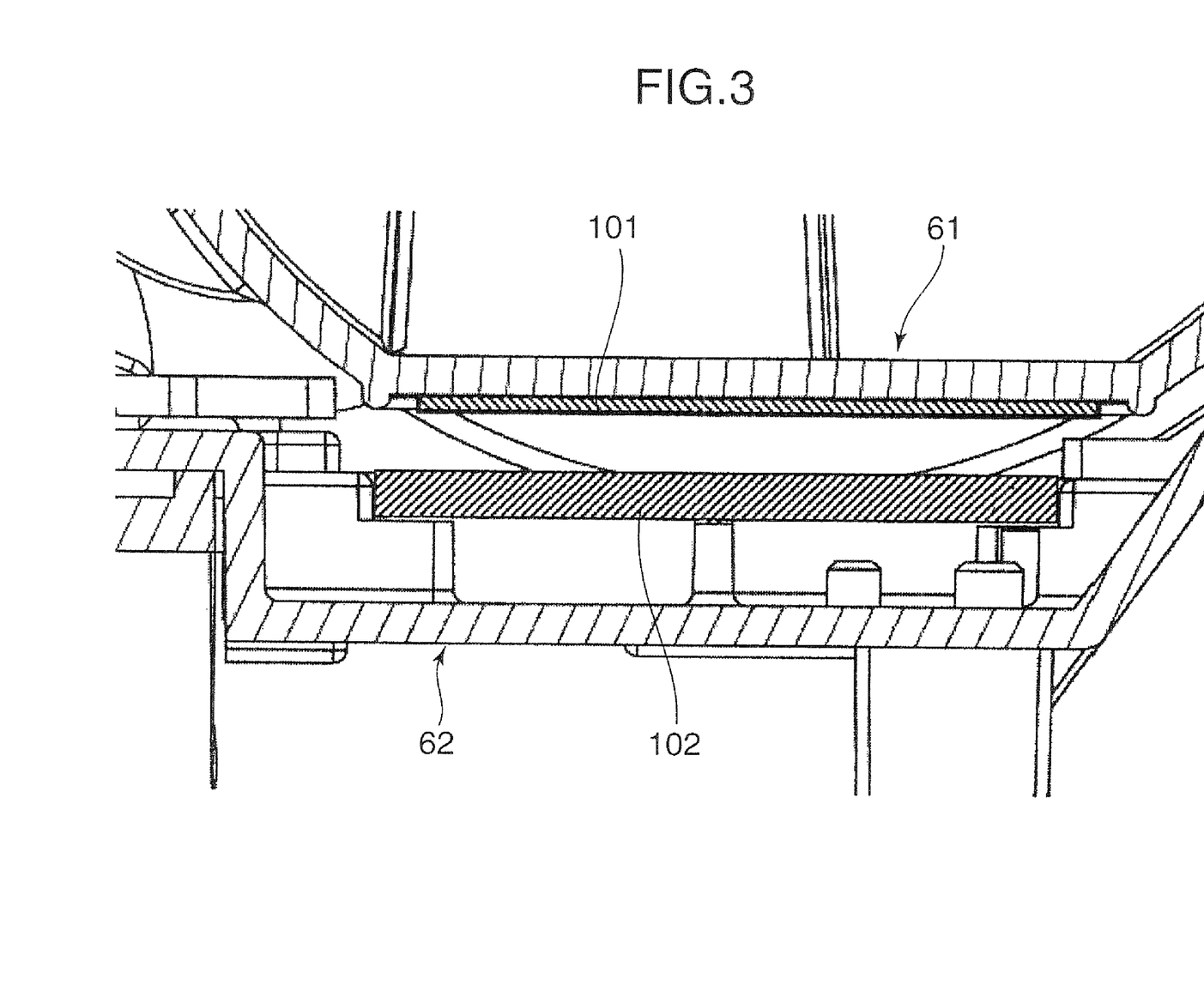
FIG. 3 is a partial enlarged view of the area of the developer portion indicated by the symbol A.

FIG. 3 is a partial enlarged view of the area of the developer portion 6 in FIG. 2 indicated by the symbol A. The configuration of the lower portion of the installed cartridge 61 is shown in detail. A wireless tag 101 is mounted on one side wall portion of the cartridge 61, and a communication unit 102 is mounted on one side wall portion of the developer unit 62. When the cartridge 61 is installed, the wireless tag 101 and the communication unit 102 are opposed with a prescribed distance (for example, approximately 5 mm) therebetween.

The wireless tag 101 performs wireless communication with the communication unit 102. The wireless tag 101 comprises a semiconductor chip (wireless IC chip) which can use electromagnetic waves to send and receive data, and an electromotive force is generated (based on the principle of electromagnetic induction) by means of electromagnetic waves from the communication unit 102, the power of the electromotive force drives a circuit to cause a response signal to a query signal output from the communication unit 102 to be output.

The communication unit (communication portion) 102 outputs query signals with a prescribed signal intensity and at a prescribed communication frequency (for example, 13.56 MHz) to perform wireless communication with a wireless tag 101. In this embodiment, the explanation assumes that the wireless tag 101 and the communication unit 102 use the 13.56 MHz frequency band.

Figure 4:
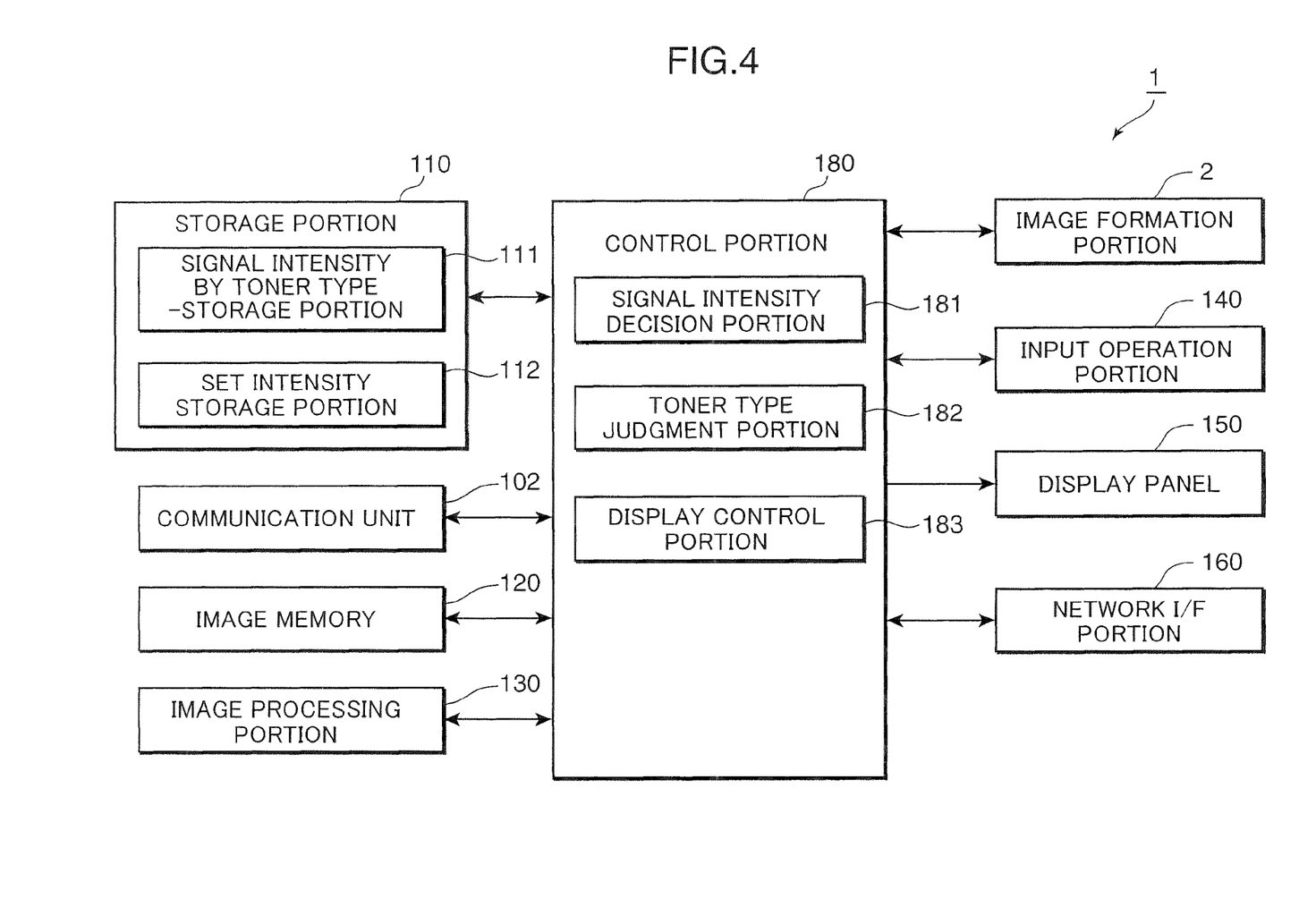
FIG. 4 is a block diagram showing the electrical configuration of the printer in a first embodiment of the invention.

FIG. 4 is a block diagram showing the electrical configuration of the printer 1 in the embodiment. The printer 1 comprises a control portion 180, storage portion 110, communication unit 102, image memory 120, image processing portion 130, image formation portion 2, input operation portion 140, display panel 150, and network I/F portion 160. Constituent elements explained using FIG. 1 are assigned the same symbols, and explanations are omitted.

The control portion 180 comprises a CPU (Central Processing Unit) or similar, which reads a program stored in the storage portion 110 and executes processing, outputs instruction signals to various functional portions, and performs data transfer and similar to comprehensively control the printer 1. The control portion 180 has a signal intensity decision portion 181, toner type judgment portion (judgment portion) 182, and display control portion 183. Each of the portions is explained in detail below using FIG. 5.

The storage portion 110 stores programs, data and similar to realize the various operations comprised by the printer 1. In this embodiment, the storage portion 110 operates as a signal intensity by toner type-storage portion 111 and as a set intensity storage portion 112. The signal intensity by toner type-storage portion (signal intensity by type-storage portion) 111 stores the signal intensity of a response signal output from a wireless tag 101 in association with the type of non-certified product toner (for example, by the manufacturer of the toner of the non-certified product) when a query signal at the predetermined frequency is output from the communication unit 102. The data stored in this signal intensity by toner type-storage portion 111 is stored in advance by installing toner cartridges for the various manufacturers in the printer 1 prior to shipment from the factory or at another time, and measuring the signal intensities of the response signals at that time.

The set intensity storage portion 112 stores intensities determined in advance (set intensities) for the signal intensities of query signals output from an antenna comprised by the communication unit 102. Set intensities are explained in detail below.

The image memory 120 temporarily stores image data transmitted from an external device via the network I/F portion 160. The image processing portion 130 performs image correction, enlargement/reduction, and other image processing of image data stored in the image memory 120. The image formation portion 2 forms a toner image based on image data output from the image memory 120. The input operation portion 140 comprises a power key used to turn on and off power to the printer 1, a reset key to reset a print job, and similar. The network I/F portion 160 comprises a LAN board or other communication module, and performs transmission and reception of various data with an external device via a network (not shown) connected to the network I/F portion 160.

Figure 5:
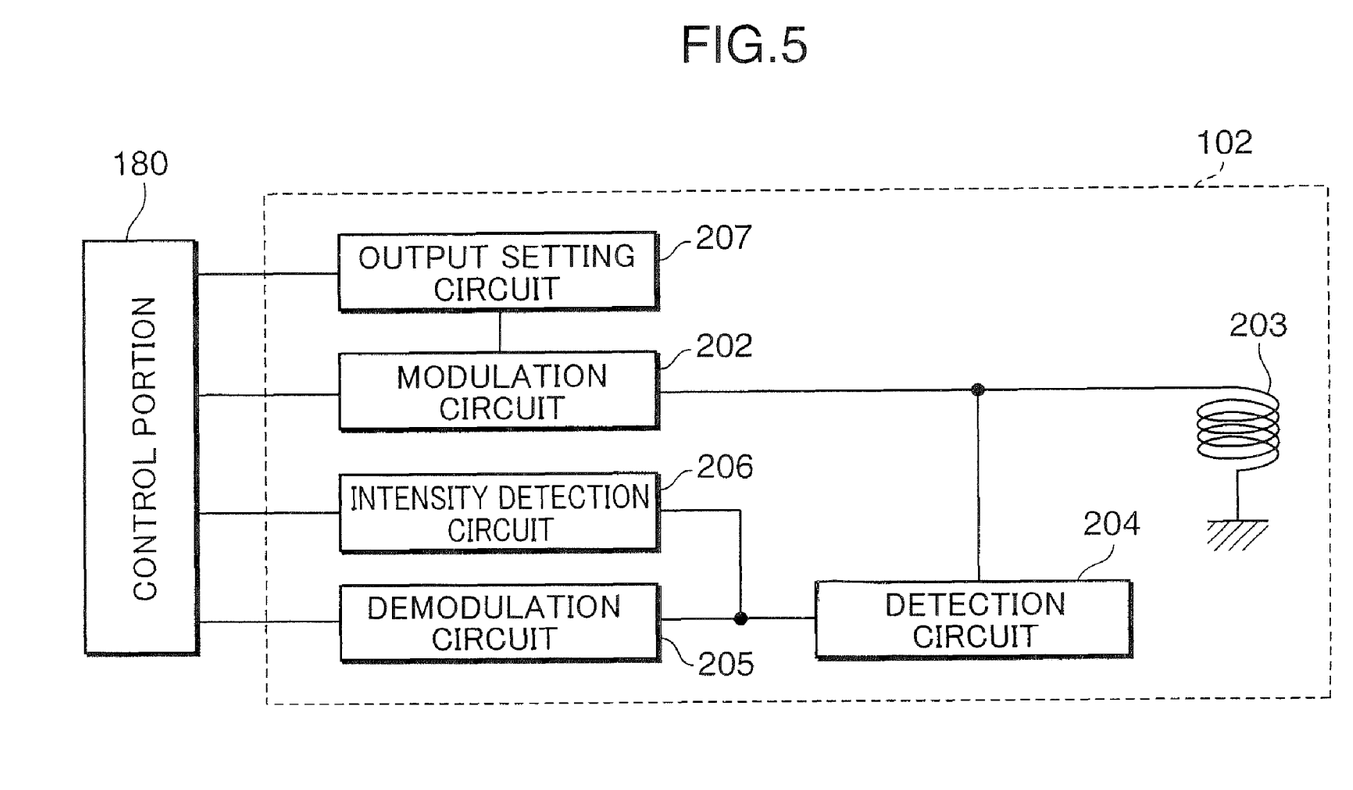
FIG. 5 is a block diagram showing the electrical configuration of the communication unit in the first embodiment of the invention.

FIG. 5 is a block diagram showing the electrical configuration of the communication unit 102. The communication unit 102 has a modulation circuit 202, an antenna 203, a detection circuit 204, a demodulation circuit 205, an intensity detection circuit 206, and an output setting circuit 207, and operates through control by the control portion 180.

The modulation circuit 202 modulates a carrier wave according to command information for a wireless tag 101 output from the control portion 180. The antenna 203 transmits modulated waves as query signals, and receives response signals transmitted from a wireless tag 101. The antenna 203 converts a received response signal into an electrical signal and outputs the signal to the detection circuit 204. The detection circuit 204 demodulates an unmodulated electrical signal, extracts information, and outputs the extracted information to the control portion 180. The demodulation circuit 205 demodulates a modulated electrical signal, extracts information, and outputs the extracted information to the control portion 180.

Figure 6:
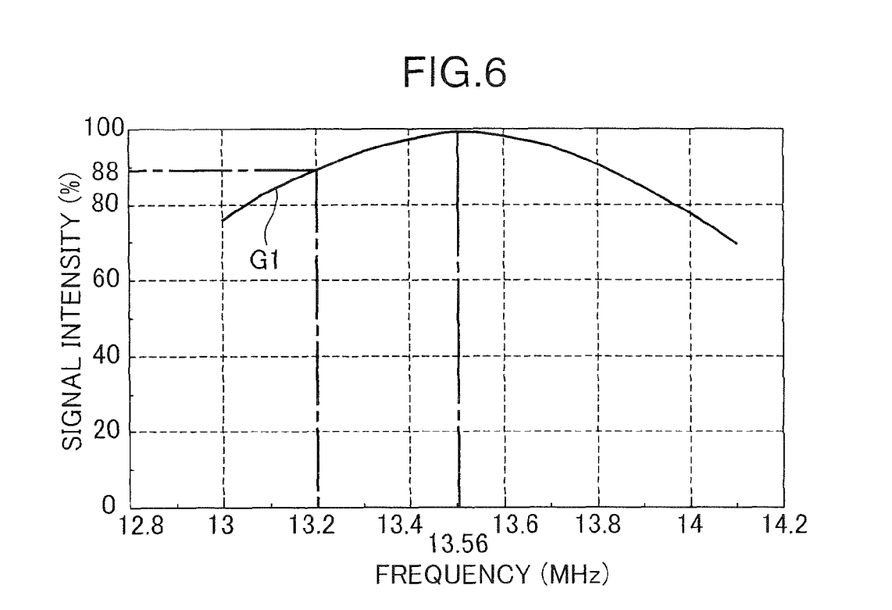
FIG. 6 is a graph showing the relation between the frequency and intensity of the response signal.
Figure 7:
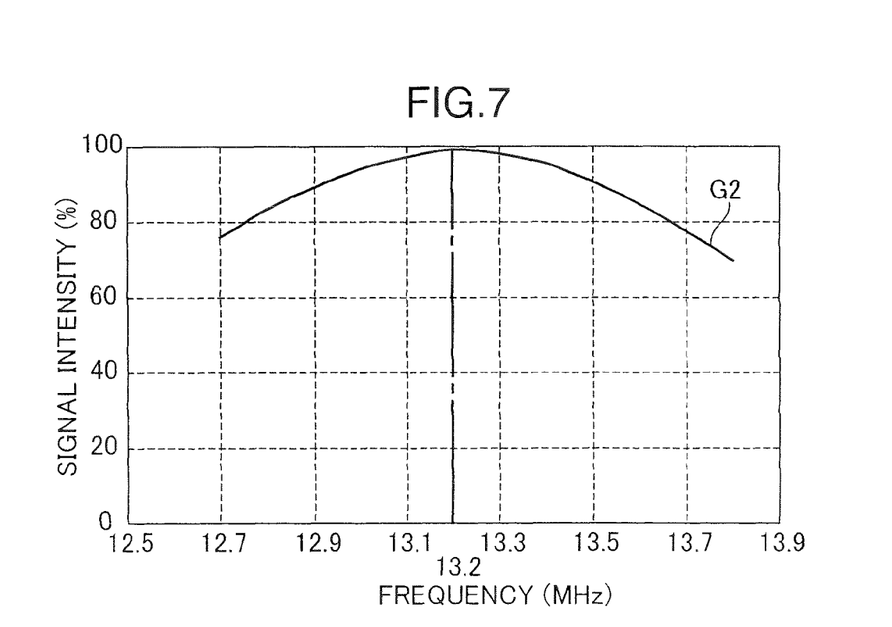
FIG. 7 is a graph showing the relation between the frequency and intensity of the response signal.

The intensity detection circuit (detection portion) 206 detects the signal intensity of a response signal, and outputs the detection result to the control portion 180. FIG. 6 and FIG. 7 are graphs showing the relation between the frequency and signal intensity of response signals. Here, it is assumed that an adequate amount of toner (for example, the amount present at the time of shipment from the factory) is housed in the cartridge 61, and that the wireless tag 101 and antenna 203 are positioned at a distance enabling normal wireless communication.

The wireless tag communication system of an embodiment of the invention comprises, in addition to the communication unit 102, the necessary portions among a toner type judgment portion 182, signal intensity by toner type-storage portion 111, set intensity storage portion 112, and display control portion 183. Also, the wireless tag communication system of an embodiment of the invention may further comprise a wireless tag 101.

The graph G1 of FIG. 6 is a graph for a case in which the toner housed in the cartridge 61 is a certified product, and the response signal is a signal with a peak value at 13.56 MHz. The graph G2 of FIG. 7 is a graph for a case in which the toner housed in the cartridge 61 is a non-certified product, and the response signal is a signal with a peak value at 13.2 MHz.

The wireless tag 101, placed at a position close to the toner, is easily affected by metal (magnetic material) comprised by the toner, and when the type of toner housed by the cartridge 61 changes, the characteristics (resonance frequency and similar) of a resonance circuit in the wireless tag 101 changes, as is well known. That is, the frequency peak value of the response signal is different in a case in which the toner housed by the cartridge 61 is a certified product, and a case in which the toner is a non-certified product.

From this, the following statements can be made. On the side of the communication unit 102, the resonance frequency of the antenna 203 is 13.56 MHz, and as the frequency deviates from this resonance frequency, the intensity of the signal received by the antenna 203 is weakened. On the other hand, on the side of the wireless tag 101, when toner which is a certified product is housed in the cartridge 61, the wireless tag 101 outputs a response signal at 13.56 MHz. Hence the antenna 203 can receive a response signal with a signal intensity of 100%.

However, when toner which is a non-certified product is housed in the cartridge 61, the effect on the resonance circuit of the wireless tag 101 changes, and as shown in FIG. 7, the wireless tag 101 outputs a response signal at 13.2 MHz. In this case, the frequency deviates from the resonance frequency of the antenna 203, so that as shown in FIG. 6, the antenna 203 can receive a response signal with a signal intensity of only 88% compared with the case of reception of a response signal at 13.56 MHz. When the signal intensity of a response signal received by the antenna 203 is insufficient, wireless communication is not performed normally, tag information is not read accurately, or other communication errors occur. And, when toner which is a non-certified product is used, the quality of images formed on recording paper may be worsened, and printer performance is degraded as a result.

Hence in this embodiment, a method is proposed for judging the toner type, or whether the toner is a certified product or a non-certified product, from the signal intensity of a response signal received by the antenna 203. Specifically, the intensity detection circuit 206 detects the signal intensity of a response signal received by the antenna 203, the toner type judgment portion 182 of the control portion 180 compares the signal intensity of the detected response signal with signal intensities stored in the signal intensity by toner type-storage portion 111, extracts the stored toner type associated with the matching signal intensity, and judges that the extracted toner type is the type of toner housed in the cartridge 61. Or, the toner type judgment portion 182 compares the signal intensity of the response signal with a set intensity stored in the set intensity storage portion 112, and when the signal intensity of the response signal is equal to or greater than the set intensity, judges that the toner housed in the cartridge 61 is a certified product.

Below, a case is explained in which the toner type judgment portion 182 judges whether the toner housed in a cartridge 61 is a certified product or a non-certified product. For example, suppose that a response signal at 13.2 MHz is output from the wireless tag 101. Suppose further that the set intensity stored in the set intensity storage portion 112 is 90%. At this time, according to the graph shown in FIG. 6, the response signal received by the antenna 203 has a signal intensity reduced to 88% compared with reception of a response signal at 13.56 MHz, so that the detection result of the intensity detection circuit 206 is 88%. That is, the signal intensity of the response signal is lower than the set intensity of 90%, so that the toner type judgment portion 182 judges the toner housed in the cartridge 61 to be a non-certified product. The set intensity stored in the set intensity storage portion 112 is set to a signal intensity of the response signal sufficient to enable accurate reading of tag information.

When the toner type judgment portion 182 judges the toner to be a non-certified product, the display control portion 183 causes a message to be displayed on the display panel 150 indicating that the toner is a non-certified product, and that image formation cannot be performed with quality guaranteed. By this means, the user can learn that the toner housed in the cartridge 61 installed in the printer 1 is a non-certified product, or that the cartridge for a printer of another manufacturer has been erroneously installed.

Further, after it has been judged that the toner is a non-certified product, the signal intensity decision portion (intensity-varying portion) 181 sets the signal intensity for query signals output from the antenna 203 to an intensity at which wireless communication is performed normally, and outputs the signal intensity thus set to the output setting circuit (intensity-varying portion) 207. For example, suppose that toner housed in the cartridge 61 is a non-certified product, and that a 13.2 MHz response signal is output from the wireless tag 101. At this time, the detection result of the intensity detection circuit 206 for the signal intensity of the response signal is 88%, as described above. The signal intensity decision portion 181 judges that in order to obtain a response signal with 100% signal intensity, an increase of 12% or more is necessary. Hence the signal intensity decision portion 181 sends to the output setting circuit 207 an instruction to increase the signal intensity by 12%. The output setting circuit 207 changes the signal intensity of query signals according to the instruction output from the signal intensity decision portion 181, and by this means query signals with modified signal intensity are output from the antenna 203.

The signal intensity decision portion 181 may decide the signal intensity of query signals such that the signal intensity of response signals is equal to a set intensity. That is, in the above example, the signal intensity of the response signal is 88% and the set intensity is 90%, so that the signal intensity decision portion 181 outputs to the output setting circuit 207 an instruction to increase the signal intensity by 2%.

The wireless tag 101 changes the signal intensity of the response signal and outputs the signal according to the signal intensity of the query signal. That is, when the antenna 203 outputs a query signal with high signal intensity, the wireless tag 101 similarly outputs a response signal with high signal intensity. In this way, after the intensity of a response signal output from the wireless tag 101 has been made higher than a set intensity, the control portion 180 inputs the tag information read out by the detection circuit 204 or demodulation circuit 205.

Figure 8:
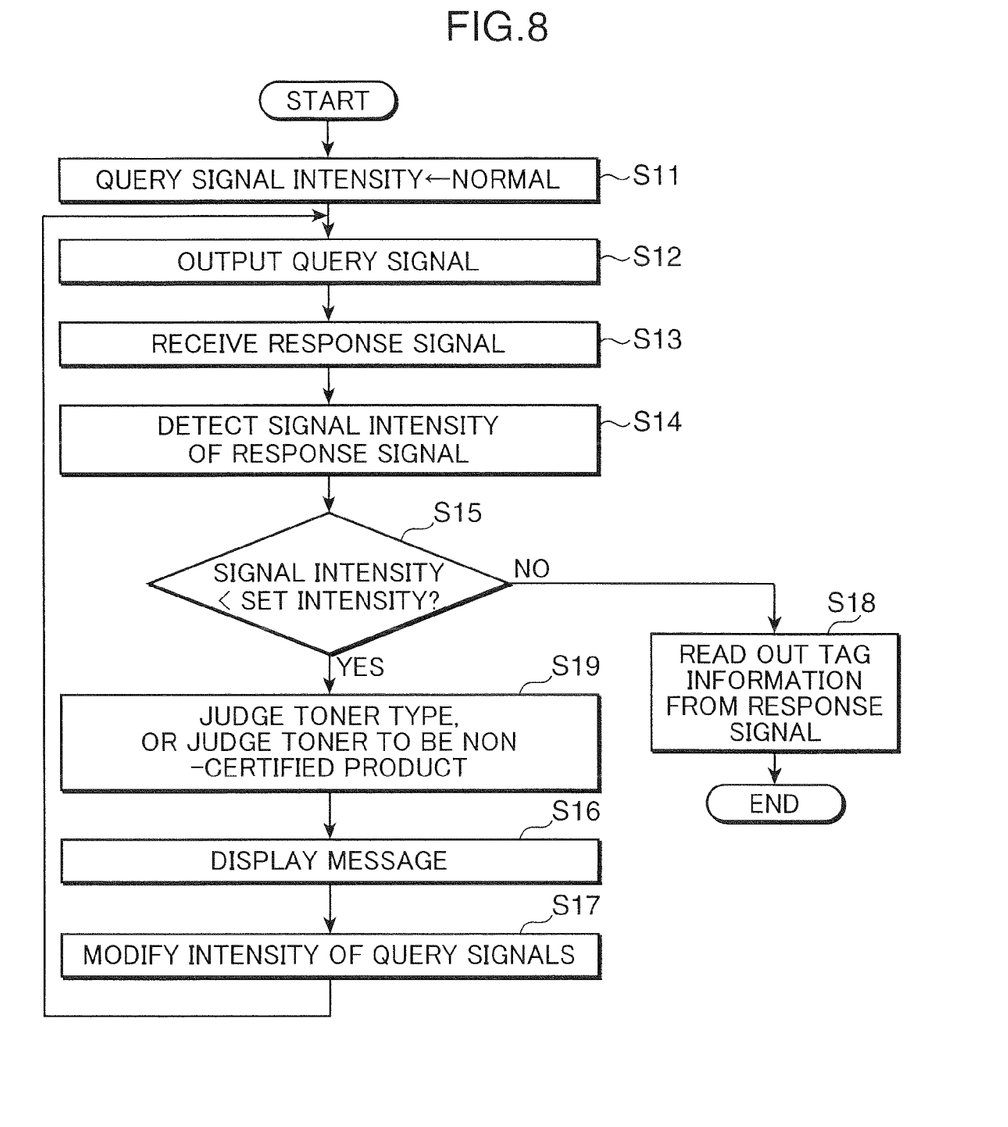
FIG. 8 is a flowchart showing operation of the communication unit in the first embodiment.

FIG. 8 is a flowchart showing the flow of operation of the control portion 180 and communication unit 102 in this embodiment. First, the signal intensity decision portion 181 decides the normal signal intensity (default signal intensity or a predetermined initial value of signal intensity) to which the intensity of query signals is to be set in advance, and outputs the instruction signal to the output setting circuit 207 (step S11). The "normal signal intensity" is the signal intensity set assuming that a response signal at 13.56 MHz is output from the wireless tag 101. As a result, a query signal having the normal signal intensity is output from the antenna 203 (step S12).

The wireless tag 101 outputs a response signal carrying tag information in response to the query signal, and the signal is received by the antenna 203 (step S13). The intensity detection circuit 206 detects the signal intensity of the response signal (step S14), and the toner type judgment portion 182 compares the detected signal intensity with the set intensity stored in the set intensity storage portion 112 (step S15).

If the signal intensity is lower than the set intensity (YES in step S15), the toner type judgment portion 182 compares the detected signal intensity of the response signal with signal intensities stored in the signal intensity by toner type-storage portion 111, extracts the stored toner type associated with the matching signal intensity, and judges the extracted toner type to be the type of toner housed in the cartridge 61. Or, the toner type judgment portion 182 judges that the toner housed in the cartridge 61 is a non-certified product (step S19). The display control portion 183 then causes a message to be displayed on the display panel 150 indicating that a cartridge 61 housing toner which is a non-certified product has been installed (step S16).

Then, the signal intensity decision portion 181 sets the signal intensity of query signals to an intensity at which wireless communication is performed normally, and the set signal intensity is output to the output setting circuit 207 (step S17). Processing proceeds to the processing of step S12, the output setting circuit 207 changes the signal intensity of the modulated wave output from the modulation circuit 202 according to an instruction from the signal intensity decision portion 181, and a modulated wave with a modified signal intensity is output from the antenna 203 as a query signal (step S12).

When the signal intensity of the response signal is equal to or above the set intensity (NO in step S15), the control portion 180 inputs tag information read out from the response signal by the detection circuit 204 or by the demodulation circuit 205 (step S18), and wireless communication processing ends.

As explained above, the change in characteristics of the resonance circuit of the wireless tag 101 with the magnetic material comprised by the toner can be utilized to judge the type of toner housed in the cartridge 61, or to judge whether the toner is a certified product. When the toner is a non-certified product, there is a possibility that guaranteed image quality cannot be maintained, and so a message is caused to be displayed on the display panel of the printer 1 to notify the user of this fact, and so convenience of use of the equipment can be improved.

Second Embodiment

In the first embodiment, a printer 1 was explained comprising a communication unit 102 in which, when a response signal is received with a signal intensity below the set intensity, the signal intensity of the query signal could be changed so as to enable normal wireless communication. In a second embodiment, a printer is explained which comprises a communication unit in which the frequency of the query signal is changed so as to enable normal wireless communication. Because summary cross-sectional views of the printer of this embodiment are the same as FIG. 1 through FIG. 3 in the first embodiment, explanations are omitted.

Figure 9:
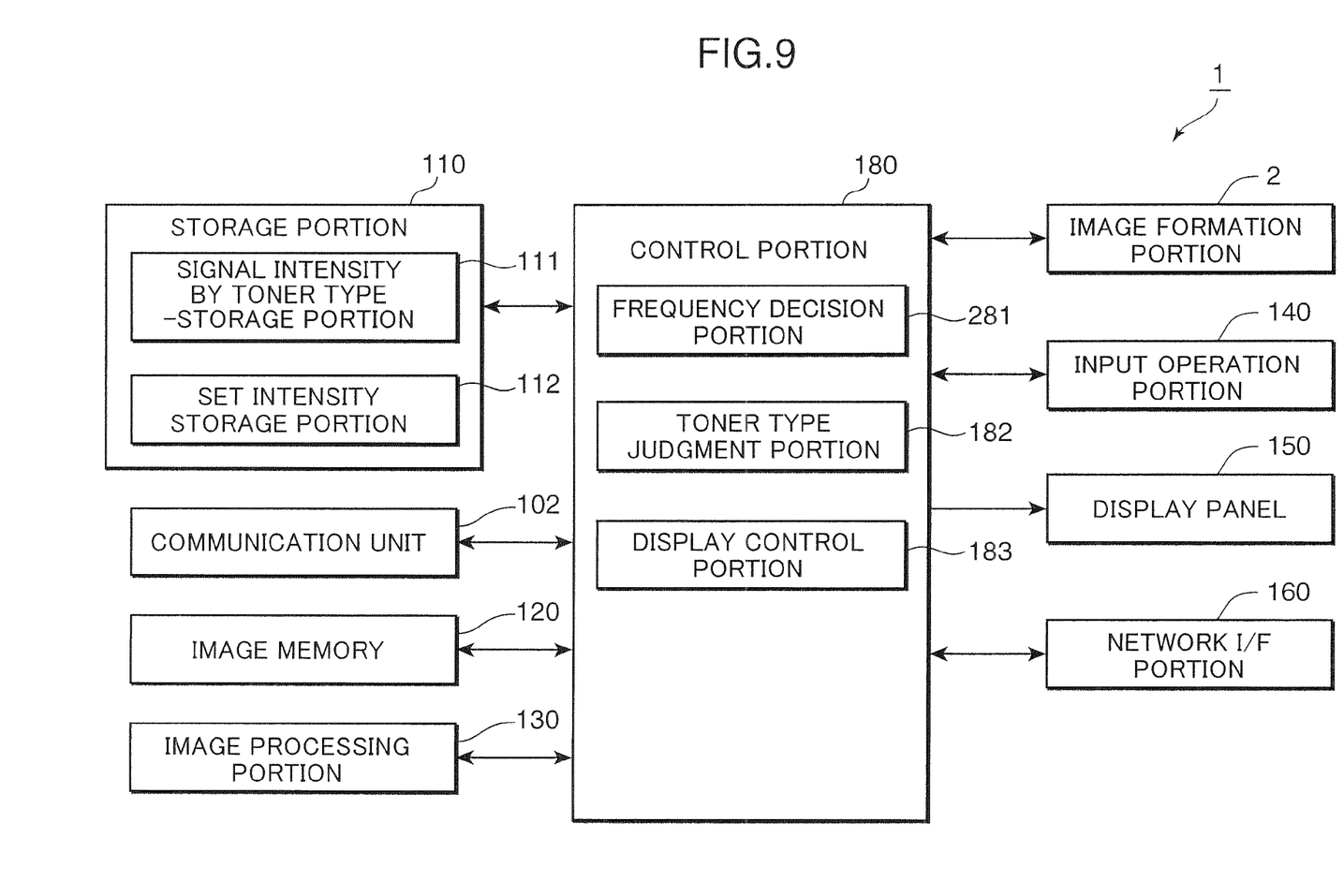
FIG. 9 is a block diagram showing the electrical configuration of the printer in a second embodiment of the invention.

FIG. 9 is a block diagram showing the electrical configuration of the printer 1 of this embodiment. Only differences with the block diagram of FIG. 4 explained in the first embodiment are explained. The control portion 180 has a frequency decision portion 281, toner type judgment portion 182, and display control portion 183. The frequency decision portion (frequency modification portion) 281 decides the frequency of query signals output from the antenna 203.

Figure 10:
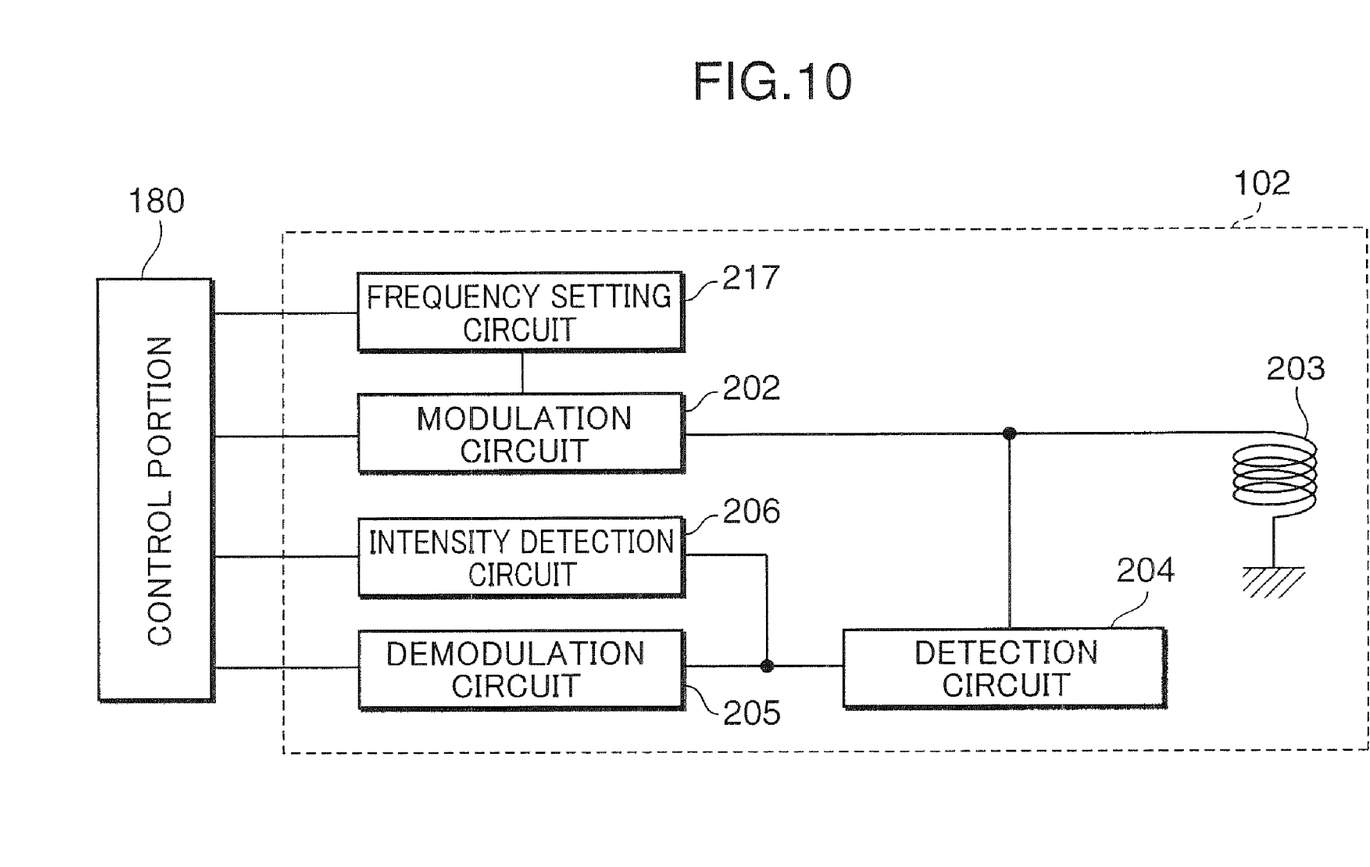
FIG. 10 is a block diagram showing the electrical configuration of the communication unit in the second embodiment.

FIG. 10 is a block diagram showing the electrical configuration of the communication unit 102 in this embodiment. Only differences with the block diagram of FIG. 5 explained in the first embodiment are explained. The frequency setting circuit (frequency modification portion) 217 changes the frequency of query signals output from the antenna 203 of the communication unit 102 according to instructions output from the frequency decision portion 281 of the control portion 180.

Figure 11:
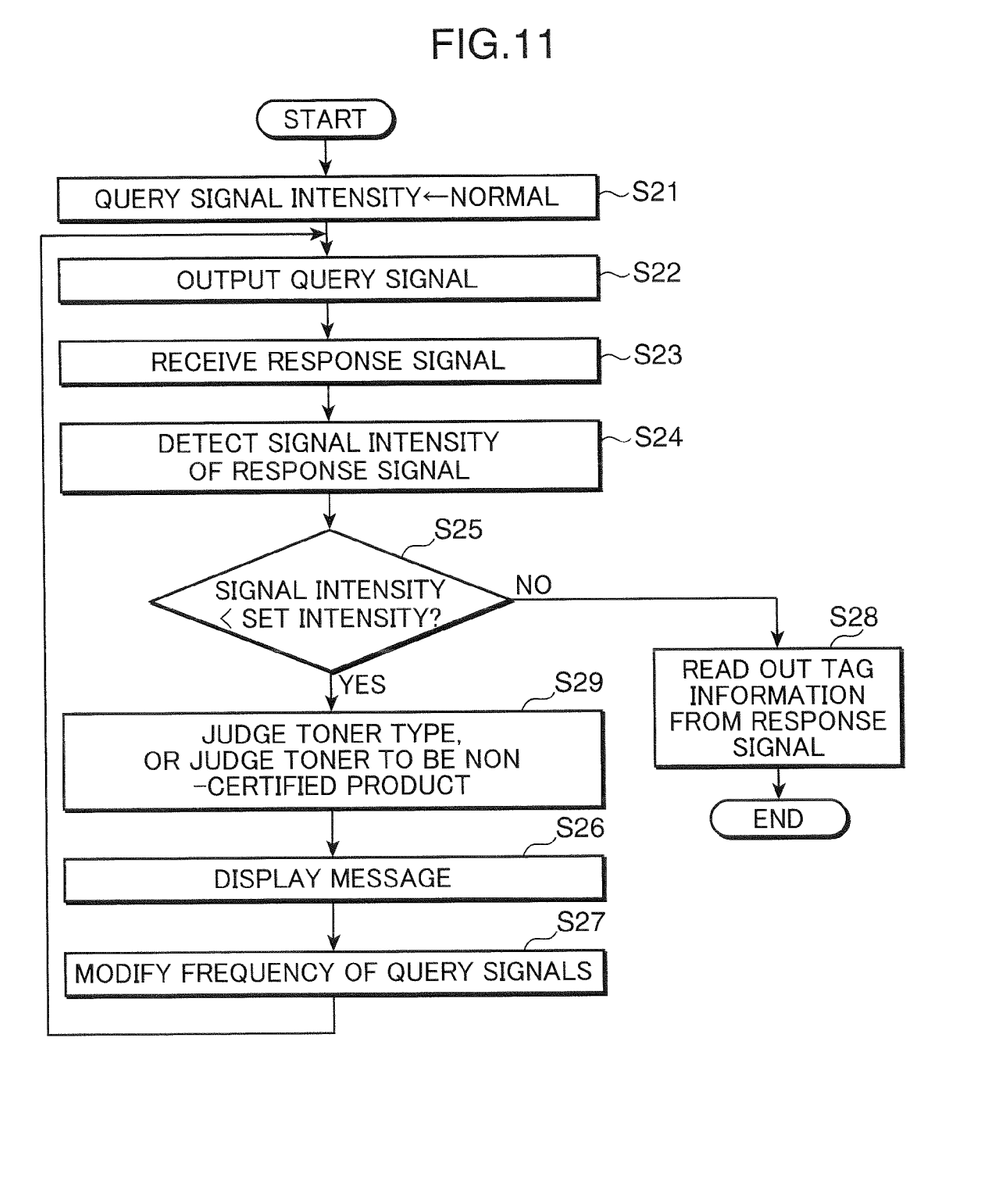
FIG. 11 is a flowchart showing operation of the communication unit in the second embodiment.

FIG. 11 is a flowchart showing the flow of operation of the control portion 180 and communication unit 102 in this embodiment. First, the frequency decision portion 281 decides the frequency of query signals to be a normal frequency set in advance (for example, 13.56 MHz), and outputs an instruction signal to the frequency setting circuit 217 (step S21). By this means, modulation waves at the normal frequency are output from the modulation circuit 202, and query signals are output from the antenna 203 (step S22).

The wireless tag 101 outputs a response signal carrying toner information in response to a query signal, and the antenna 203 receives this response signal (step S23). And, the intensity detection circuit 206 detects the signal intensity of the response signal (step S24), and the toner type judgment portion 182 compares the detected signal intensity with the set intensity stored in the set intensity storage portion 112 (step S25).

When the signal intensity is lower than the set intensity (step S25), the toner type judgment portion 182 compares the detected signal intensity of the response signal with signal intensities stored in the signal intensity by toner type-storage portion 111, extracts the type of toner stored in association with the matching signal intensity, and judges that the extracted toner type is the type of toner housed in the cartridge 61. Or, the toner type judgment portion 182 judges that the toner housed in the cartridge 61 is a non-certified product (step S29). Then, the display control portion 183 causes a message to be displayed on the display panel 150 indicating that a cartridge 61 housing toner which is a non-certified product has been installed (step S26).

For example, suppose that the toner housed in the cartridge 61 is a non-certified product, and that due to the effect of the magnetic material comprised by the toner which is a non-certified product, the resonance frequency of the resonance circuit of the wireless tag 101 has changed to 13.2 MHz. In this case, a response signal at 13.2 MHz is output from the wireless tag 101. And, suppose that the set intensity stored in the set intensity storage portion 112 is 90%. At this time, the intensity of the response signal received by the antenna 203 is 88%, according to the graph shown in FIG. 6. Because the signal intensity of the response signal is lower than the set intensity of 90%, the toner type judgment portion 182 judges that the toner housed in the cartridge 61 is a non-certified product.

The frequency decision portion 281 decides the frequency of query signals output from the antenna 203 to be a frequency at which wireless communication is performed normally, and outputs an instruction signal comprising the frequency thus decided to the frequency setting circuit 217, while also performing control to cause the resonance frequency of the antenna 203 to be changed to the frequency thus decided (step S27).

For example, suppose that a response signal at 13.2 MHz is output from the wireless tag 101. The frequency decision portion 281 computes the frequency of the response signal to be 13.2 MHz from the graph shown in FIG. 6 or from a calculation formula stored in advance and from the signal intensity of the response signal detected by the intensity detection circuit 206. And, an instruction signal is output to the frequency setting circuit 217 to cause the frequency of query signals to be lowered by 360 kHz. When the frequency decision portion 281 computes the frequency of a response signal, if the graph shown in FIG. 6 or a calculation formula is used, the storage portion 110 stores in advance the graph of FIG. 6 or the calculation formula.

The frequency setting circuit 217 changes the frequency of query signals to 13.2 MHz according to the instruction signal output from the frequency decision portion 281, and by this means query signals at the changed frequency are output from the antenna 203. On the other hand, the frequency decision portion 281 performs control to reduce the resonance frequency of the antenna 203 by 360 kHz. By means of this control, the resonance frequency of the antenna 203 is tuned to the frequency of response signals output from the wireless tag 101.

When the signal intensity of the response signal is equal to or greater than the set intensity (NO in step S25), the control portion 180 inputs tag information read out from the response signal by the detection circuit 204 or demodulation circuit 205 (step S28), and wireless communication processing ends.

As explained above, the change in characteristics of the resonance circuit of the wireless tag 101 due to the magnetic material comprised by the toner can be utilized to judge the type of toner housed in the cartridge 61, or to judge whether the toner is a certified product or not. When the toner is a non-certified product, there is the possibility that the guaranteed image quality cannot be maintained, and so by causing a message to be displayed on the display panel of the printer 1, the user can be notified of this fact, so convenience of use of the equipment can be improved.

This invention is not limited to the configuration of the above-described embodiments, and can be modified in various ways. For example, in the above embodiments, when the detected signal intensity is less than an set intensity stored in the set intensity storage portion 112, the toner type judgment portion 182 judges that the toner housed in the cartridge 61 is a non-certified product. In addition to this method, when the frequency decision portion 281 calculates the frequency of the response signal from the detected signal intensity of a response signal, and the difference between the calculated frequency and the normal frequency is equal to or greater than a prescribed value, the toner may be judged to be a non-certified product. That is, when for example the prescribed value is 300 kHz, the normal frequency is 13.56 MHz, and the calculated frequency is 13.2 MHz, the difference is 360 kHz. Because this difference is equal to or greater than the prescribed value, the toner type judgment portion 182 judges the toner housed in the cartridge 61 to be a non-certified product.

In essence, this invention relates to a wireless tag communication system, comprising: a communication portion which outputs a query signal to a wireless tag mounted on a toner housing body, and which receives a response signal in response to the query signal from the wireless tag, to perform wireless communication; a detection portion which detects the signal intensity of the response signal; and a judgment portion which, when the query signal is output from the communication portion at a normal signal intensity determined in advance, judges the type of toner housed in the toner housing body from the signal intensity of the response signal output from the wireless tag.

The wireless tag mounted on the toner housing body is readily affected by metal (magnetic material) comprised by the toner, and it is well known that when the type of toner housed in the toner housing body changes, the resonance frequency of a resonance circuit of the wireless tag changes. That is, when the frequency of the response signal output from the wireless tag changes due to the effect of the toner, the intensity of the response signal received by the communication portion declines. This fact is utilized in this invention to judge the type of toner housed in the cartridge from the signal intensity of the response signal. Hence even when tag information stored in the wireless tag of a toner housing body which is a certified product is stored in the wireless tag of a toner housing body which is a non-certified product, the toner type can be judged, regardless of the tag information.

Here, "certified product" means a genuine product of the manufacturer or a product certified by the manufacturer, and "non-certified product" means a product other than a certified product.

That is, by means of this invention, changes in the characteristics of the resonance circuit of a wireless tag due to magnetic material comprised by the toner can be utilized to accurately judge the type of toner housed in a cartridge from the signal intensity of a response signal.

This invention further comprises a set intensity storage portion which stores, as a set intensity, the signal intensity of the response signal obtained when normal wireless communication can be performed by the wireless tag and the communication portion, and the judgment portion judges whether the toner housed in the toner housing body is a certified product or is a non-certified product, and when the communication portion outputs the query signal at the normal signal intensity determined in advance, if the signal intensity of the response signal detected by the detection portion is equal to or greater than the set intensity stored in the set intensity storage portion, the judgment portion judges the toner housed in the toner housing body to be a certified product.

By means of this invention, the change in characteristics of the resonance circuit of a wireless tag due to magnetic material comprised by the toner is utilized, and whether the toner housed in the cartridge is a certified product or not can be judged from the signal intensity of the response signal.

This invention further comprises an intensity modification portion which, when the toner housed in the toner housing body is judged to be a non-certified product by the judgment portion, decides on an intensity of the query signal after this judgment so as to allow normal wireless communication to be performed by the wireless tag and the communication portion, and modifies the signal intensity of the query signal.

This invention enables stabilized wireless communication, after using the response signal intensity to judge the toner type, by outputting a query signal having suitable signal intensity, and by increasing the signal intensity of the response signal.

This invention further comprises a frequency modification portion which, when the toner housed in the toner housing body is judged to be a non-certified product by the judgment portion, decides on a frequency of the query signal after this judgment so as to allow normal wireless communication to be performed by the wireless tag and the communication portion, and modifies the frequency of the query signal.

By means of this invention, after the intensity of the response signal has been used in toner judgment, the frequency of query signals can be modified according to the frequency of response signals received by the communication portion, so that even when for example the frequency of response signals changes due to the influence of the toner, by changing the frequency of the query signals according to this change, the wireless tag can normally receive query signals, and stable wireless communication can be performed.

This invention further comprises a signal intensity by type-storage portion, which stores, in association with the type of toner, signal intensities of the response signals output from the wireless tag when the query signals are output from the communication portion at the normal signal intensity determined in advance; and when the toner housed in the toner housing body is judged to be a non-certified product by the judgment portion, the judgment portion judges, after this judgment, the type of toner stored in association with the signal intensity matching the signal intensity of the response signal detected by the detection portion when the query signal with normal signal intensity determined in advance is output from the communication portion, among the signal intensities of the response signals stored in the signal intensity by type-storage portion, to be the type of toner housed in the toner housing body.

By means of this invention, the change in characteristics of the resonance circuit of the wireless tag due to magnetic material comprised by the toner can be utilized to judge the type of toner housed in the cartridge from the signal intensity of the response signal.

This invention further comprises a display control portion which controls display of a display portion; and the display control portion causes the display portion to display a message according to a judgment result of the judgment portion.

By means of this invention, when the toner is a non-certified product, because there is the possibility that the performance of the equipment in which the wireless tag communication system is mounted may be worsened, it is possible that the guaranteed image quality cannot be maintained. Hence by causing the display portion to display a message according to the judgment result, the user can be notified of this fact.

This invention also relates to an image forming apparatus, comprising: a communication portion which outputs a query signal to a wireless tag mounted on a toner housing body, and which receives a response signal in response to the query signal from the wireless tag, to perform wireless communication; a detection portion which detects the signal intensity of the response signal; a judgment portion which, when the query signal is output from the communication portion at a normal signal intensity determined in advance, judges the type of toner housed in the toner housing body from the signal intensity of the response signal output from the wireless tag; and an image formation portion which forms an image on a recording medium.

This invention also relates to a wireless tag communication system, comprising: a wireless tag, mounted on a toner housing body; a communication portion which outputs a query signal to the wireless tag, and which receives a response signal in response to the query signal from the wireless tag, to perform wireless communication; a detection portion which detects the signal intensity of the response signal; and a judgment portion which, when the query signal is output from the communication portion at a normal signal intensity determined in advance, judges the type of toner housed in the toner housing body from the signal intensity of the response signal output from the wireless tag.

This application is based on Japanese Patent application serial No. 2008-287342 filed in Japan Patent Office on Nov. 10, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A wireless tag communication system, comprising: a communication portion which outputs a query signal to a wireless tag mounted on a toner housing body, and which receives a response signal in response to the query signal from the wireless tag, to perform wireless communication; a detection portion which detects the signal intensity of the response signal; and a judgment portion which, when the query signal is output from the communication portion at a reference signal intensity determined in advance, judges the type of toner housed in the toner housing body from the signal intensity of the response signal output from the wireless tag, wherein the signal intensity of the response signal is determined by the interaction of the composition of the type of toner housed in the toner housing body on wireless tag.

2. The wireless tag communication system according to claim 1, further comprising a set intensity storage portion which stores, as a set intensity, the signal intensity of the response signal obtained when successful wireless communication can be performed by the wireless tag and the communication portion, wherein the judgment portion judges whether the toner housed in the toner housing body is a certified product or is a non-certified product, and when the communication portion outputs the query signal at the reference signal intensity determined in advance, if the signal intensity of the response signal detected by the detection portion is equal to or greater than the set intensity stored in the set intensity storage portion, the judgment portion judges the toner housed in the toner housing body to be a certified product.

3. The wireless tag communication system according to claim 2, further comprising an intensity modification portion which, when the toner housed in the toner housing body is judged to be a non-certified product by the judgment portion, decides on an intensity of the query signal after this judgment so as to allow successful wireless communication to be performed by the wireless tag and the communication portion, and modifies the signal intensity of the query signal.

4. The wireless tag communication system according to claim 2, further comprising a frequency modification portion which, when the toner housed in the toner housing body is judged to be a non-certified product by the judgment portion, decides on a frequency of the query signal after this judgment so as to allow successful wireless communication to be performed by the wireless tag and the communication portion, and modifies the frequency of the query signal.

5. The wireless tag communication system according to claim 1, further comprising a signal intensity by type-storage portion, which stores, in association with the type of toner, signal intensities of the response signals output from the wireless tag when the query signals are output from the communication portion at the reference signal intensity determined in advance, wherein when the toner housed in the toner housing body is judged to be a non-certified product by the judgment portion, the judgment portion judges, after this judgment, the type of toner stored in association with the signal intensity matching the signal intensity of the response signal detected by the detection portion when the query signal with reference signal intensity determined in advance is output from the communication portion, among the signal intensities of the response signals stored in the signal intensity by type-storage portion, to be the type of toner housed in the toner housing body.

6. The wireless tag communication system according to claim 1, further comprising a display control portion which controls display of a display portion, wherein the display control portion causes the display portion to display a message according to a judgment result of the judgment portion.

7. An image forming apparatus, comprising: a communication portion which outputs a query signal to a wireless tag mounted on a toner housing body, and which receives a response signal in response to the query signal from the wireless tag, to perform wireless communication; a detection portion which detects the signal intensity of the response signal; a judgment portion which, when the query signal is output from the communication portion at a reference signal intensity determined in advance, judges the type of toner housed in the toner housing body from the signal intensity of the response signal output from the wireless tag, wherein the signal intensity of the response signal is determined by the interaction of the composition of the type of toner housed in the toner housing body on wireless tag; and an image formation portion which forms an image on a recording medium.

8. A wireless tag communication system, comprising: a wireless tag, mounted on a toner housing body; a communication portion which outputs a query signal to the wireless tag, and which receives a response signal in response to the query signal from the wireless tag, to perform wireless communication; a detection portion which detects the signal intensity of the response signal; and a judgment portion which, when the query signal is output from the communication portion at a reference signal intensity determined in advance, judges the type of toner housed in the toner housing body from the signal intensity of the response signal output from the wireless tag, wherein the signal intensity of the response signal is determined by the interaction of the composition of the type of toner housed in the toner housing body on wireless tag.

* * * * *